United States Patent
Hinman et al.

(10) Patent No.: US 9,552,124 B2
(45) Date of Patent: Jan. 24, 2017

(54) CHARACTER BASED SEARCH AND DISCOVERY OF MEDIA CONTENT

(75) Inventors: John Hinman, San Francisco, CA (US); Ray DeRenzo, Walnut Creek, CA (US); Timothy Chan, Union City, CA (US); Allen Billings, Lafeyette, CA (US); Stephen Coney, San Francisco, CA (US); David Brubeck, Pleasanton, CA (US)

(73) Assignee: MobiTV, Inc., Emeryville, CA (US)

( * ) Notice: Subject to any disclaimer, the term of this patent is extended or adjusted under 35 U.S.C. 154(b) by 192 days.

(21) Appl. No.: 13/457,906

(22) Filed: Apr. 27, 2012

(65) Prior Publication Data
US 2013/0290904 A1 Oct. 31, 2013

(51) Int. Cl.
G06F 3/048 (2013.01)
G06F 17/30 (2006.01)

(52) U.S. Cl.
CPC ......... *G06F 3/048* (2013.01); *G06F 17/30244* (2013.01); *G06F 17/30253* (2013.01)

(58) Field of Classification Search
CPC .............. G06K 9/3283; G06K 9/00711; G06K 9/00221; G06K 9/00255; G06F 17/30852; G06F 17/30; G06F 17/30864; G06F 17/30398; G06F 17/3053; G06F 17/30554; G06F 17/30696; G06F 17/30991; G06F 3/0481; G06F 3/0484; G06F 17/30846; G06F 17/30244; G06F 17/30247; G06F 17/30817; G06F 17/30843; G06F 17/30528; G06F 17/30997; H04N 7/00
USPC ................. 715/704, 838, 716, 723; 382/118
See application file for complete search history.

(56) References Cited

U.S. PATENT DOCUMENTS

| | | | |
|---|---|---|---|
| 2007/0098350 A1* | 5/2007 | Gibbon et al. ................. 386/46 |
| 2007/0101268 A1* | 5/2007 | Hua et al. ..................... 715/721 |
| 2008/0080743 A1* | 4/2008 | Schneiderman et al. ...... 382/118 |
| 2009/0083225 A1* | 3/2009 | Jacobs ................... G06Q 30/02 |
| 2009/0164419 A1* | 6/2009 | Taylor et al. ..................... 707/3 |
| 2010/0070523 A1* | 3/2010 | Delgo et al. ................. 707/769 |
| 2010/0153999 A1* | 6/2010 | Yates ................. H04N 5/44543 725/39 |
| 2011/0225608 A1* | 9/2011 | Lopatecki ............... G06F 15/16 725/34 |
| 2011/0282906 A1* | 11/2011 | Wong ........................... 707/780 |

* cited by examiner

*Primary Examiner* — Amy Ng
*Assistant Examiner* — Sang H Kim
(74) *Attorney, Agent, or Firm* — Kwan & Olynick LLP (57) ABSTRACT

Mechanisms are provided for character-based and image-based media content search and discovery. Character images or entity images are mapped to corresponding media content. Selection of an image or a portion of an image may trigger or search for corresponding media content or begin playback of relevant media content. Character images or entity images need not correspond to a primary program character or object but may correspond to minor characters or tangential entities depicted periodically on particular programs.

20 Claims, 5 Drawing Sheets

CHARACTER BASED SEARCH AND DISCOVERY OF MEDIA CONTENT

TECHNICAL FIELD

The present disclosure relates to character-based search and discovery of media content.

DESCRIPTION OF RELATED ART

A variety of conventional mechanisms allow for media discovery. Different text-based and image-based program guides allow navigation to particular programs and shows. For instance, a user can enter text search string to identify content having descriptions corresponding to the text search string. Snapshots of video clips may be presented on a page to the user along with title and content descriptions. Numerous mechanisms allow for search and discovery of media content.

However, many media discovery mechanisms remain heavily text-focused. Consequently, techniques are provided to improve search and discovery of media content.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular operations and types of content. However, it should be noted that the techniques of the present invention apply to a variety of operations and types of content. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for character-based and image-based media content search and discovery. Character images or entity images are mapped to corresponding media content. Selection of an image or a portion of an image may trigger a search for corresponding media content or begin playback of relevant media content. Character images or entity images need not correspond to a primary program character or object but may correspond to minor characters or tangential entities depicted periodically on particular programs.

Example Embodiments

Conventional media search and discovery mechanisms are text-focused. Information is typically provided at the channel, show, and episode level with title, content description, and possibly show snapshots presented to a user often in grid type formats. A user navigates to a particular channel, show, and episode and select the episode to begin playback of that episode. In some instances, video clips are provided with show snapshots, title, and content description and playback begins with selection of the title or snapshot.

However, mechanisms for performing character- or entity-based searches are limited. For example, if a viewer wants to navigate to videos portraying the character Swiper the Fox, the viewer may navigate to time slots and select particular episodes of Dora the Explorer™. These episodes of Dora the Explorer™ may or may not feature Swiper the Fox. The user would then have to browse through a selection of show titles, if available, to guess which shows might feature Swiper the Fox. In some instances, there may be websites that feature Swiper the Fox and fans may have indicated where Swiper the Fox was prominently featured. However, out-of-band search still does not allow easy access to shows, clips, or segments featuring Swiper the Fox.

Consequently, the techniques and mechanisms of the present invention identify programs, movies, clips, and segments featuring a particular character or entity. In some examples, segments may be portions of a show or program. In particular embodiments, the segments are manually identified, delineated, and tagged. In other instances, the segments are identified automatically by using image recognition or voice recognition algorithms to identify particular characters or entities. In still other examples, web content is scanned or crawled to identify segments that feature particular characters or entities.

According to various embodiments, a viewer may wish to find segments featuring the pyramids. There may be some media content explicitly featuring pyramids in the title or content description. However, there may be numerous other segments featuring pyramids that may not readily be identifiable. Consequently, when a user selects an image of a pyramid, the techniques and mechanisms of the present invention provide programs, movies, shows, clips, advertisements, and media segments that depict pyramids. Media segments may be mere 5 second segments or run far longer.

In some examples, various images that include multiple characters and entities may be presented to a viewer to allow a viewer to select a character or entity. The selection of the character or entity can immediately playback media featuring the character or entity or trigger a search for media content featuring the character or entity. The search results may be automatically played for the user after display of the results for a predetermined period of time.

Figure 1:
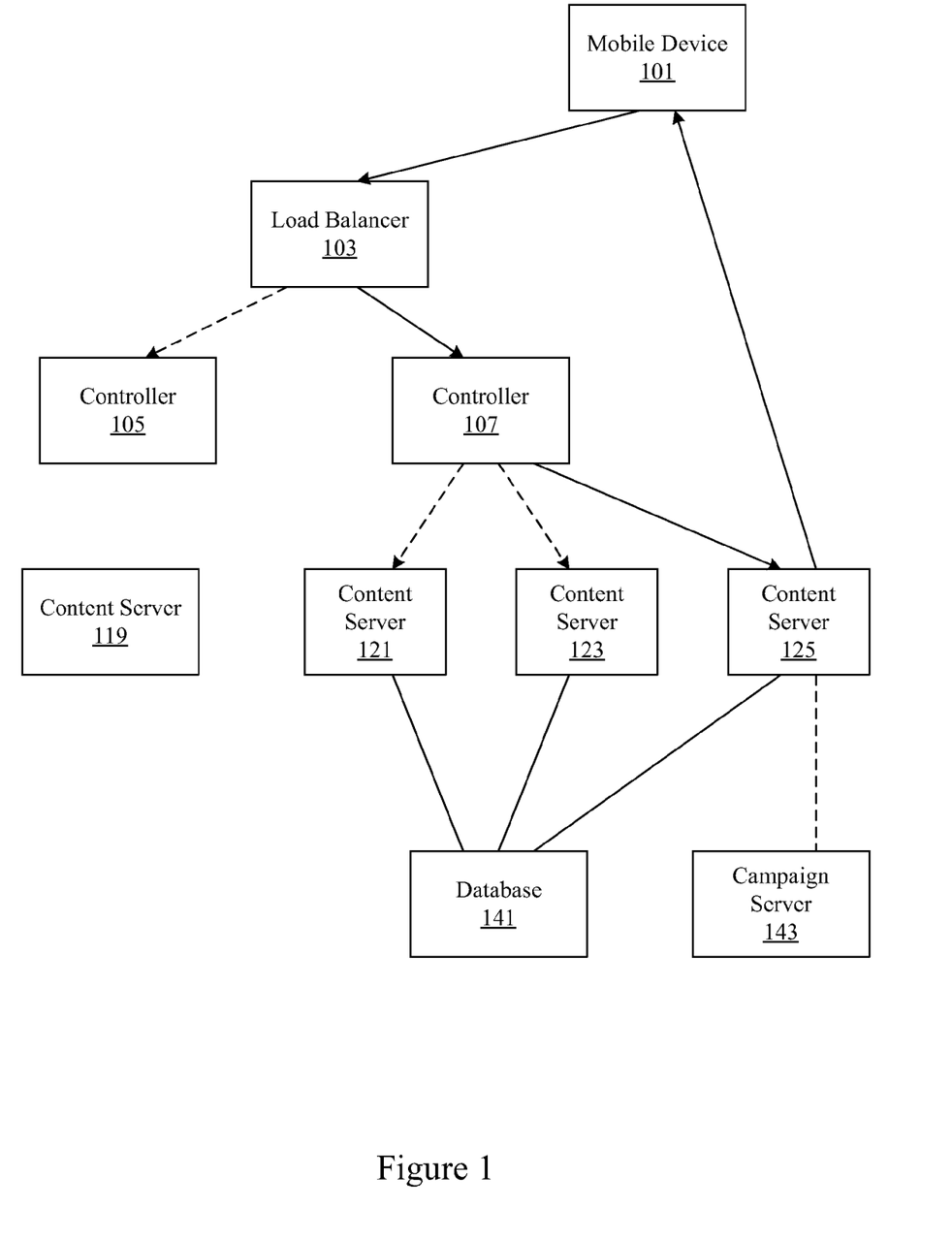
FIG. 1 illustrates one example of a system that can use the techniques and mechanisms of the present invention.

FIG. 1 is a diagrammatic representation illustrating one example of a system that can use the techniques and mechanisms of the present invention. According to various embodiments, content servers 119, 121, 123, and 125 are configured to provide media content to a mobile device 101. In some examples, media content may be provided using protocols such as HTTP, RTP, and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content to mobile devices. Session management itself may include far fewer transactions. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 can also receive media streams from content providers such as satellite providers or cable providers and send the streams to devices. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101. In particular examples, the content server 125 obtains profile information from campaign server 143.

In some examples, the content server 125 can also obtain profile information from other sources, such as from the mobile device 101 itself. Using the profile information, the content server can select a clip from a database 141 to provide to a user. In some instances, the clip is injected into a live stream without affecting mobile device application performance. In other instances, the live stream itself is replaced with another live stream. The content server handles processing to make the transition between streams and clips seamless from the point of view of a mobile device application. In still other examples, advertisements from a database 141 can be intelligently selected from a database 141 using profile information from a campaign server 143 and used to seamlessly replace default advertisements in a live stream. Content servers 119, 121, 123, and 125 have the capability to manipulate packets to allow introduction and removal of media content, tracks, metadata, etc.

Figure 2:
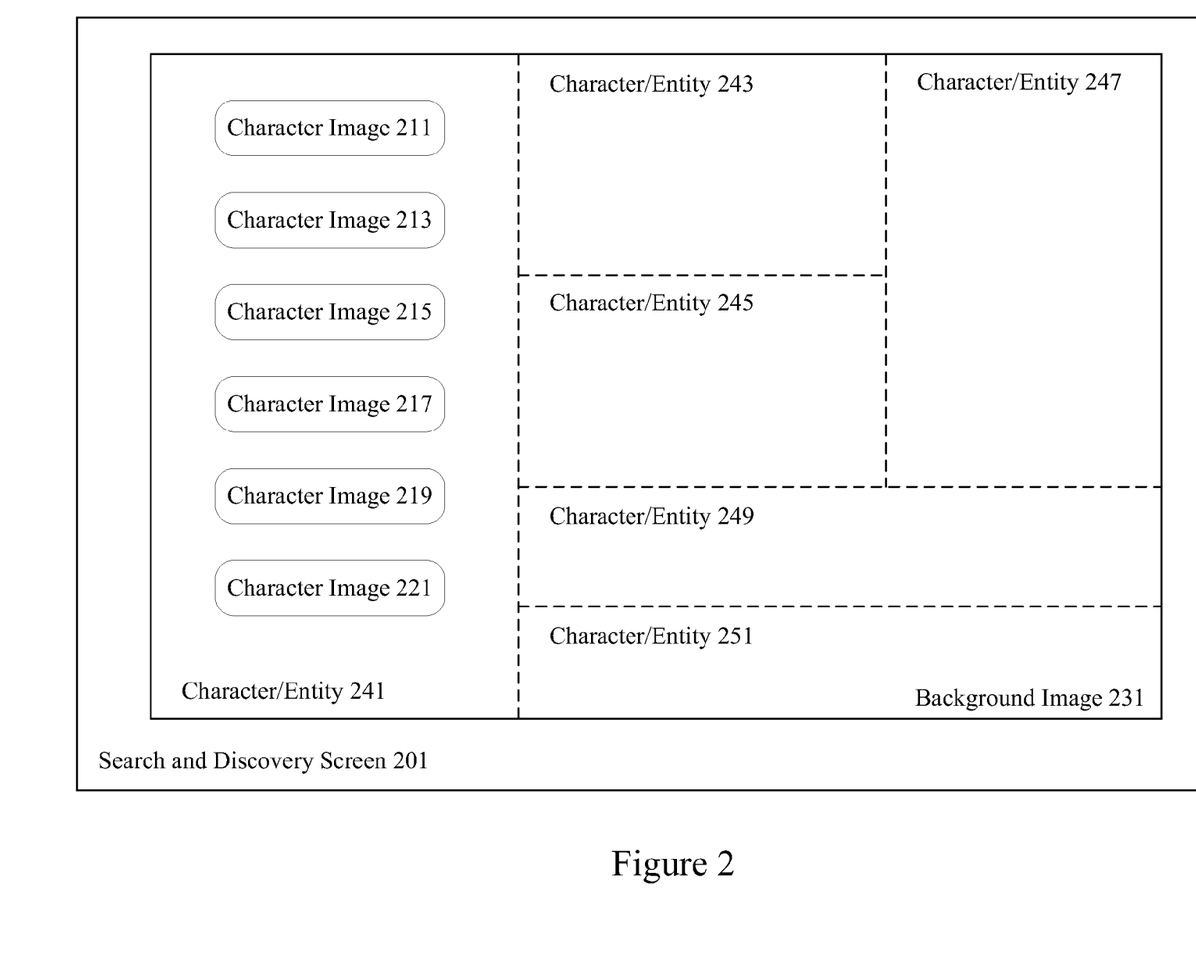
FIG. 2 illustrates one example of a character-based media search and discovery screen.

FIG. 2 illustrates one example of a search and discovery screen. According to various embodiments, the search and discovery screen 201 includes a plurality of character images 211, 213, 215, 217, 219, and 221. Selection of a character image 211, 213, 215, 217, 219, or 221 can trigger immediate playback of a media segment depicting a corresponding character, trigger a search for relevant media content, trigger delayed playback of media content after search results are shown, etc. In particular embodiments, a background image 231 includes selectable characters and entities 241, 243, 245, 247, 249, and 251. Selection of a character or entity image 241, 243, 245, 247, 249, and 251 can trigger immediate playback of a media segment depicting a corresponding character or entity, trigger a search for relevant media content, trigger delayed playback of media content after search results are shown, etc. It should be noted that although a particular configuration of character images and entity images is shown, a variety of configurations are possible. In some examples, only character images or only entity images may be displayed. In other examples, a combination of character images and entity images may be selectable in a dynamically varying sequence. In some examples, character images and entity images may be selectable in a video.

According to various embodiments, character images and background images may change automatically over time or may change after user interaction. In particular embodiments, a viewer may click a button or a wheel to rotate character images on and off of a display. A variety of character images and entity images may be shown. In some examples, only a background image may be shown. In other examples, multiple images each with multiple characters and entities may be displayed on a single page. In some examples, selectable images and entities may be highlighted during navigation to show selectability.

In some examples, viewers may be able to select multiple images to identify clips featuring both of those characters or entities. For example, a viewer may select an image of an actor and a particular vehicle, to identify segments featuring the actor and that vehicle. In other examples, a viewer may select images of two cartoon characters to identify segments featuring both of those cartoon characters.

Figure 3:
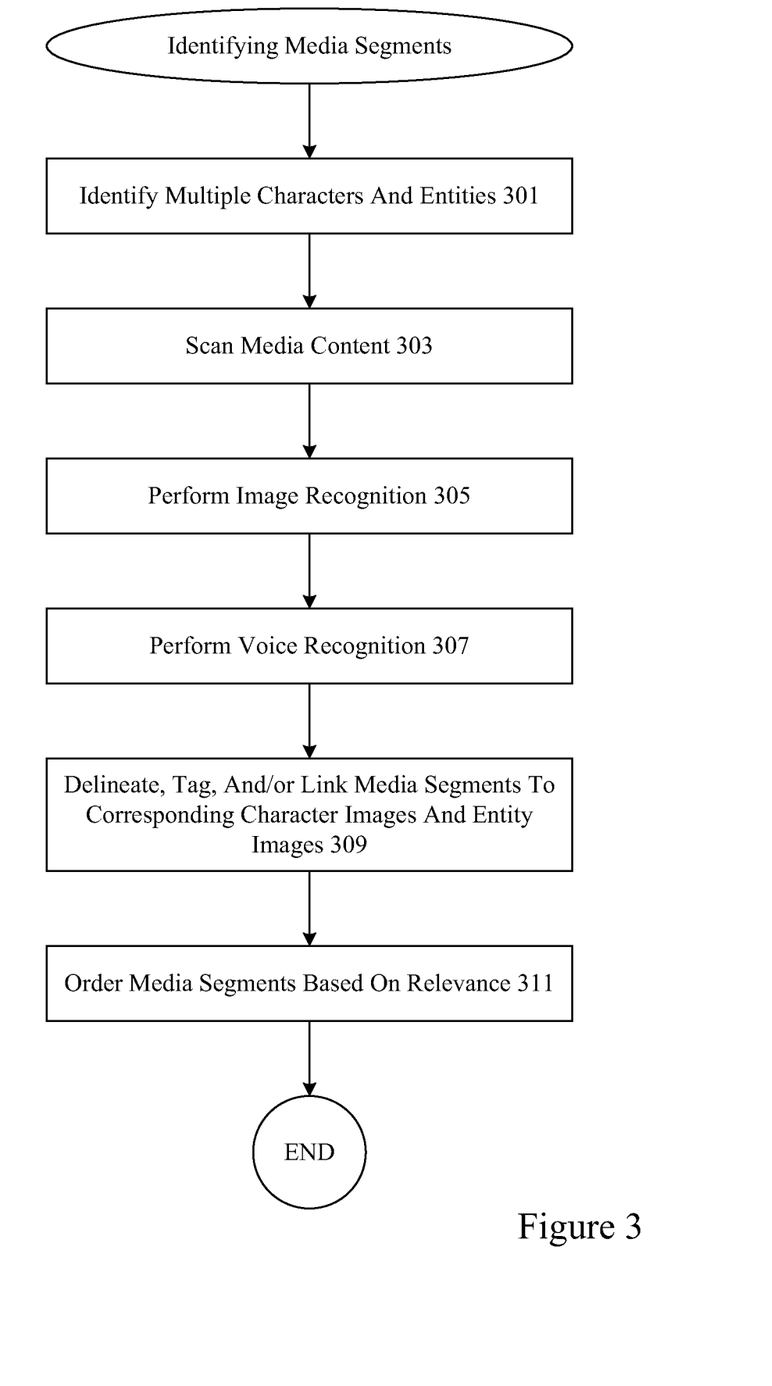
FIG. 3 illustrates one example of a technique for generating information for character- and entity-based media discovery.

FIG. 3 illustrates one example of a technique for identifying media segments. According to various embodiments, a character based media search and discovery system identifies multiple characters and entities at 301. The characters may be actors, actresses, cartoon characters, puppets, fictional characters, computer animated individuals, etc. The entities may be objects, places, things, as well as types of scenes such as action sequences, romantic scenes, etc. According to various embodiments, media content from a source such as a media content library is scanned at 303. The scan may be performed manually or by using image recognition and voice recognition algorithms to identify particular characters and entities. In some examples, image recognition is performed at 305 and voice recognition is performed at 307 to identify characters and entities.

According to various embodiments, media segments are delineated, tagged, and/or linked to corresponding character images and entity images at 309. In some instances, media segments may be delineated by specifying start points and end points. Tags may include character names, entity names, and likelihood of relevance. In some instances, segments may have tags associated with multiple characters and entities. At 311, media segments are ordered based on relevance. A selection of a particular character image may begin playback of a media segment having the highest relevance. In other examples, selection of a particular character or entity image may present a listing of media segments having the highest relevance.

Figure 4:
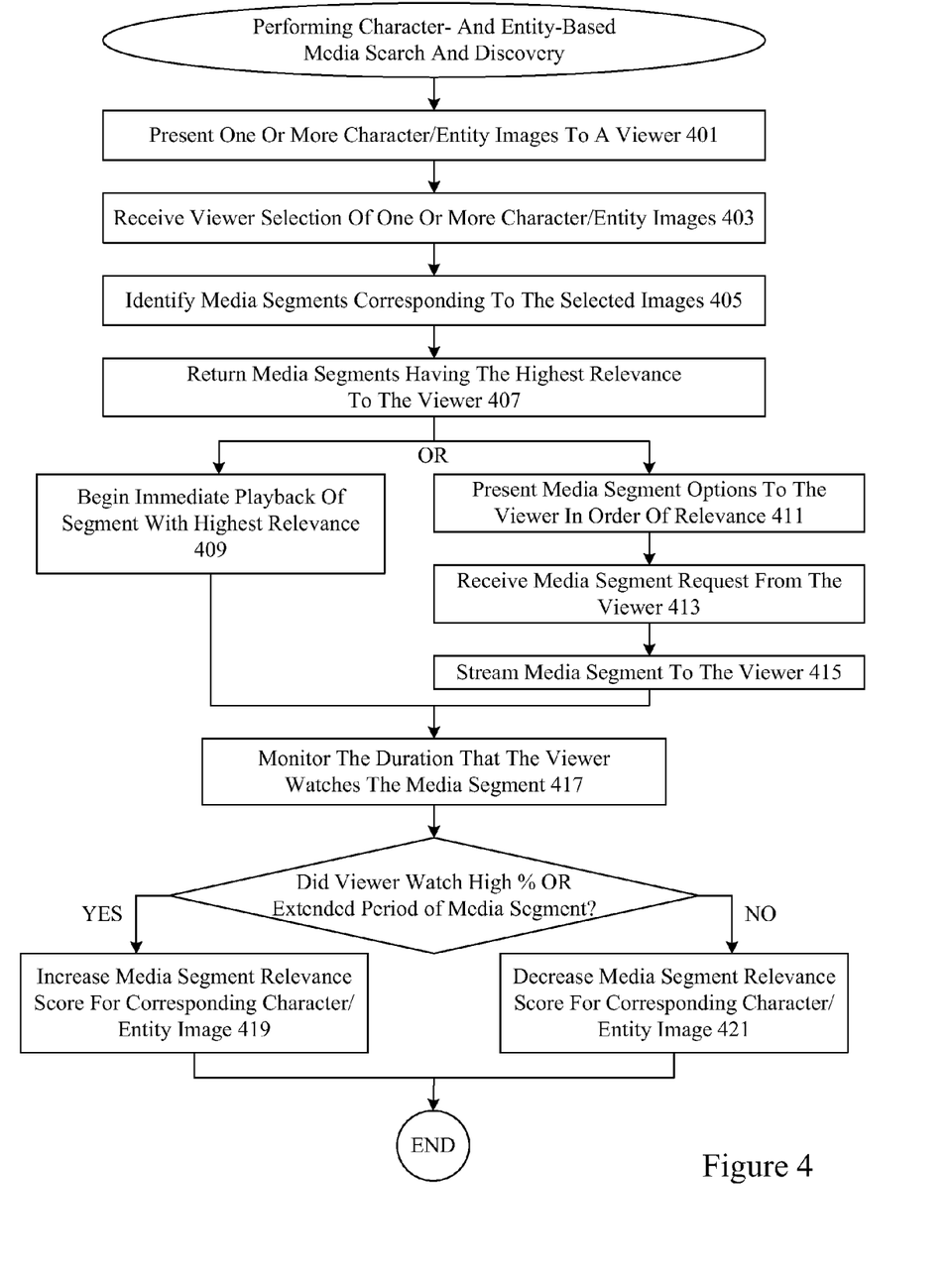
FIG. 4 illustrates one example of a technique for performing character- and entity-based media content discovery.

FIG. 4 illustrates a particular example of a technique for performing character-based and entity-based media search and discovery. According to various embodiments, one or more character and/or entity images are presented to a viewer at 401. In particular embodiments, a viewer selection of one or more character and/or entity images is received at 403. At 405, media segments corresponding to the selected images are identified. The media segments may be portions of a program, and entire movie, a video clip, etc. At 407, media segments having the highest relevance are returned to the viewer. In some examples, playback of the segment with the highest relevance begins immediately at 409. In other examples, media segment options are presented to the viewer in order of relevance at 411.

According to various embodiments, a media segment request is received from the viewer at 413 and the media segment is streamed to the viewer at 415. According to various embodiments, the duration the viewer watches the media segment is monitored to determine how relevant the media segment was to the user at 417. If the viewer watches a high percentage of the media segment or watches for an extended period of time, the media segment relevance score for the corresponding character or entity image is increased at 419. If the viewer watches a low percentage of the media segment or watches for a limited period of time, the media segment relevance score may be decreased at 421.

Figure 5:
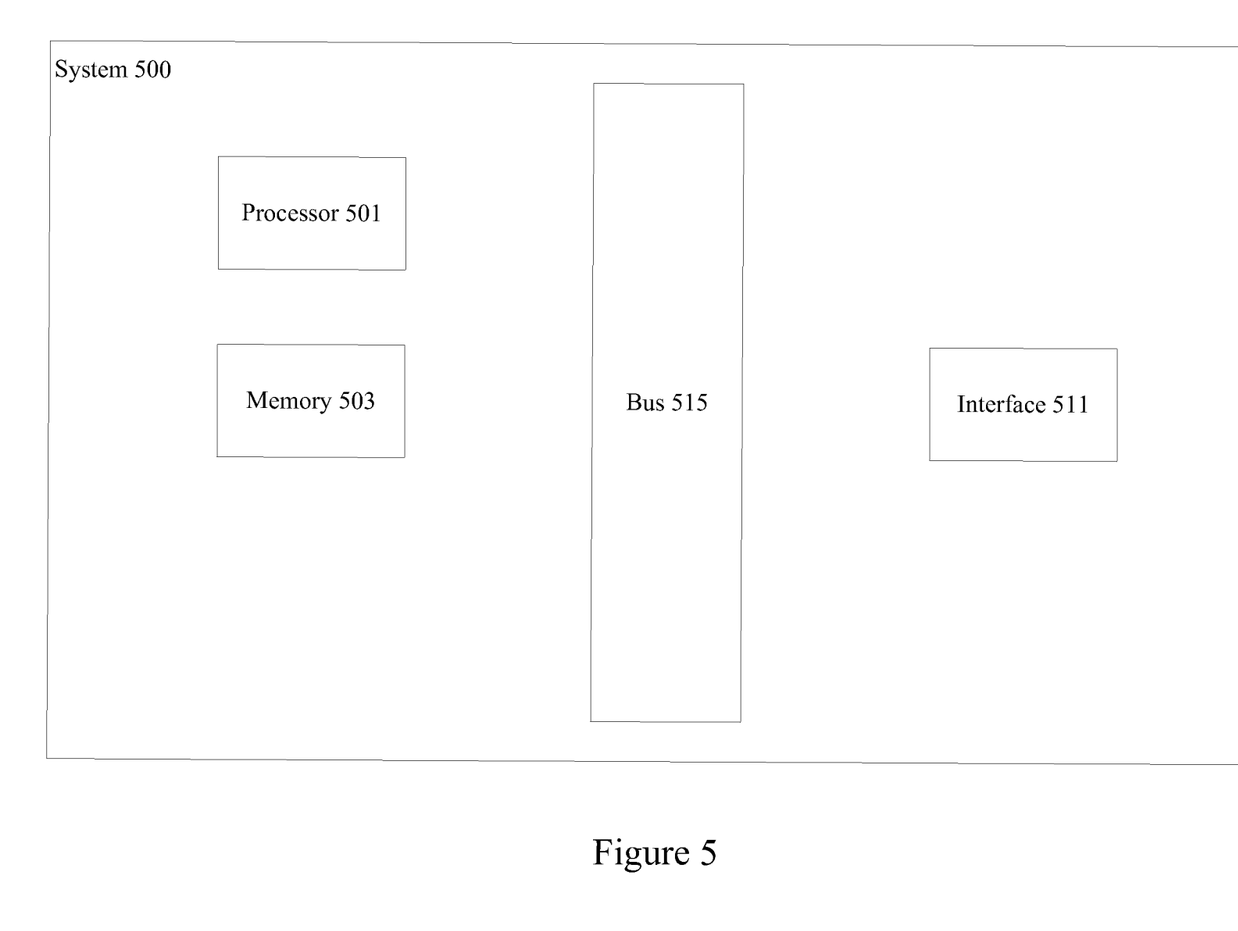
FIG. 5 illustrates one example of a computer system.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for modifying and transmitting media content to a client. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a content server that also includes a transceiver, streaming buffers, and a program guide database. The content server may also be associated with subscription management, logging and report generation, and monitoring capabilities. In particular embodiments, the content server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the content server handles requests and responses for media content-related transactions while a separate streaming server provides the actual media streams.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
   presenting a plurality of character images simultaneously on a display;
   receiving, from a viewer, a viewer selection of a first character image from the plurality of character images;
   identifying a plurality of media segments, including a first media segment, wherein the plurality of media segments are delineated, tagged, and linked to corresponding character images in the plurality of character images, the first media segment having the highest relevance with the first character image based on a relevance score, the relevance score indicating how relevant a media segment is to the viewer, the relevance score indicating how much the first media segment corresponds to the first character image;
   beginning playback of the first media segment on the display upon identifying the first media segment, wherein playback begins automatically in response to receiving the viewer selection of the first character image;
   monitoring a duration that the viewer watches the first media segment having the highest relevance with the first character image, wherein the duration that the viewer watches the first media segment is one factor for adjusting the relevance score;

increasing the relevance score based on the duration that the viewer watches the first media segment exceeding a threshold amount of time such that increased relevance score indicates that the first media segment has a higher correspondence to the first character image; and decreasing the relevance score based on the duration that the viewer watches the first media segment being less than the threshold amount of time such that relevance score indicates that the first media segment has a lower correspondence to the first character image.

2. The method of claim 1, wherein a plurality of entity images are presented with the plurality of character images simultaneously.

3. The method of claim 1, wherein a viewer selects the first character image and a second character image.

4. The method of claim 3, wherein the first media segment has the highest relevance with both the first character image and the second character image.

5. The method of claim 1, wherein a viewer selects the first character image and a first entity image.

6. The method of claim 5, wherein the first media segment has the highest relevance with both the first character image and the first entity image.

7. The method of claim 1, wherein the media segment is a portion of a media program.

8. The method of claim 1, wherein the media segment is a full media program.

9. A system comprising:
a display operable to present a plurality of character images simultaneously on a display;
an interface operable to receive, from a viewer, a viewer selection of a first character image from the plurality of character images; and
a processor operable to:
identify a plurality of media segments, including a first media segment, wherein the plurality of media segments are delineated, tagged, and linked to corresponding character images in the plurality of character images, the first media segment having the highest relevance with the first character image based on a relevance score, the relevance score indicating how relevant a media segment is to the viewer, the relevance score indicating how much the first media segment corresponds to the first character image;
begin playback of the first media segment on the display upon identifying the first media segment, wherein playback begins automatically in response to receiving the viewer selection of the first character image;
monitor a duration that the viewer watches the first media segment having the highest relevance with the first character image, wherein the duration that the viewer watches the first media segment is one factor for adjusting the relevance score;
increase the relevance score based on the duration that the viewer watches the first media segment exceeding a threshold amount of time such that increased relevance score indicates that the first media segment has a higher correspondence to the first character image; and
decrease the relevance score based on the duration that the viewer watches the first media segment being less than the threshold amount of time such that relevance score indicates that the first media segment has a lower correspondence to the first character image.

10. The system of claim 9, wherein a plurality of entity images are presented with the plurality of character images simultaneously.

11. The system of claim 9, wherein a viewer selects the first character image and a second character image.

12. The system of claim 11, wherein the first media segment has the highest relevance with both the first character image and the second character image.

13. The system of claim 9, wherein a viewer selects the first character image and a first entity image.

14. The system of claim 13, wherein the first media segment has the highest relevance with both the first character image and the first entity image.

15. The system of claim 9, wherein the media segment is a portion of a media program.

16. The system of claim 9, wherein the media segment is a full media program.

17. A non-transitory computer readable medium comprising:
computer code for presenting a plurality of character images simultaneously on a display;
computer code for receiving, from a viewer, a viewer selection of a first character image from the plurality of character images;
computer code for identifying a plurality of media segments, including a first media segment, wherein the plurality of media segments are delineated, tagged, and linked to corresponding character images in the plurality of character images, the first media segment having the highest relevance with the first character image based on a relevance score, the relevance score indicating how relevant a media segment is to the viewer, the relevance score indicating how much the first media segment corresponds to the first character image;
computer code for beginning playback of the first media segment on the display upon identifying the first media segment, wherein playback begins automatically in response to receiving the viewer selection of the first character image;
computer code for monitoring a duration that the viewer watches the first media segment having the highest relevance with the first character image, wherein the duration that the viewer watches the first media segment is one factor for adjusting the relevance score;
computer code for increasing the relevance score based on the duration that the viewer watches the first media segment exceeding a threshold amount of time such that increased relevance score indicates that the first media segment has a higher correspondence to the first character image; and
computer code for decreasing the relevance score based on the duration that the viewer watches the first media segment being less than the threshold amount of time such that relevance score indicates that the first media segment has a lower correspondence to the first character image.

18. The non-transitory computer readable medium of claim 17, wherein a plurality of entity images are presented with the plurality of character images simultaneously.

19. The non-transitory computer readable medium of claim 17, wherein a viewer selects the first character image and a second character image.

20. The non-transitory computer readable medium of claim 19, wherein the first media segment has the highest relevance with both the first character image and the second character image.

\* \* \* \* \*